(12) United States Patent
Allo (10) Patent No.: US 10,725,676 B2
(45) Date of Patent: Jul. 28, 2020

(54) WRITE ONCE READ MANY (WORM) DRIVE FOR SECURITY OR LARGE STORAGE NEEDS

(71) Applicant: Seagate Technology LLC, Cupertino, CA (US)

(72) Inventor: Christopher Nicholas Allo, Longmont, CO (US)

(73) Assignee: Seagate Technology, LLC, Fremont, CA (US)

( * ) Notice: Subject to any disclaimer, the term of this patent is extended or adjusted under 35 U.S.C. 154(b) by 0 days.

(21) Appl. No.: 16/219,351

(22) Filed: Dec. 13, 2018

(65) Prior Publication Data

US 2019/0347020 A1 Nov. 14, 2019

Related U.S. Application Data

(60) Provisional application No. 62/670,385, filed on May 11, 2018.

(51) Int. Cl.
| | |
|---|---|
| *G06F 13/10* | (2006.01) |
| *G06F 3/06* | (2006.01) |
| *G06F 16/18* | (2019.01) |
| *G06F 12/02* | (2006.01) |

(52) U.S. Cl.
CPC ............ *G06F 3/0623* (2013.01); *G06F 3/064* (2013.01); *G06F 3/0619* (2013.01); *G06F 3/0634* (2013.01); *G06F 3/0677* (2013.01); *G06F 12/023* (2013.01); *G06F 16/181* (2019.01)

(58) Field of Classification Search
CPC ...................................................... G06F 13/10
See application file for complete search history.

(56) References Cited

U.S. PATENT DOCUMENTS

| 6,185,661 B1 | 2/2001 | Ofek et al. |
|---|---|---|
| 6,272,086 B1 | 8/2001 | Jaquette et al. |
| 7,958,166 B2 | 6/2011 | Hsu |
| 2005/0231846 A1* | 10/2005 | Winarski ......... G11B 20/00086 360/69 |
| 2005/0235095 A1 | 10/2005 | Winarski et al. |

* cited by examiner

*Primary Examiner* — Cheng Yuan Tseng
(74) *Attorney, Agent, or Firm* — Hall Estill Attorneys at Law (57) ABSTRACT

Apparatus and method for configuring a data storage device as a write once read many (WORM) drive. In some embodiments, the storage device has a rotatable disc with at least one data recording layer, and a data transducer that is selectively moveable with respect to the rotatable disc. The data transducer has a write element configured to write data to the data recording layer, and a read element configured to read data from the data recording layer. A control circuit is configured to physically disable the write element in response to a write element disable signal. The disabling of the write element prevents further writing of data to the data recording layer. The read element remains operative to continue reading data from the data recording layer after the write element has been disabled.

20 Claims, 6 Drawing Sheets

WRITE ONCE READ MANY (WORM) DRIVE FOR SECURITY OR LARGE STORAGE NEEDS

RELATED APPLICATION

The present application makes a claim of domestic priority under 35 U.S.C. § 119(e) to U.S. Provisional Application No. 62/670,385 filed May 11, 2018, the contents of which are incorporated by reference.

SUMMARY

Various embodiments of the present invention are generally directed to configuring a data storage device as a write once read many (WORM) drive.

In some embodiments, the storage device has a rotatable disc with at least one data recording layer, and a data transducer that is selectively moveable with respect to the rotatable disc. The data transducer has a write element configured to write data to the data recording layer, and a read element configured to read data from the data recording layer. A control circuit is configured to physically disable the write element in response to a write element disable signal. The disabling of the write element prevents further writing of data to the data recording layer. The read element remains operative to continue reading data from the data recording layer after the write element has been disabled.

These and other features and advantages of various embodiments can be understood with a review of the following detailed description in conjunction with the accompanying drawings.

DETAILED DESCRIPTION

The present disclosure is generally directed to data storage systems, and more particularly to a low cost solution to providing reliable, long term storage of user data using a write once, read many (WORM) drive. The various embodiments supply high capacity storage at relatively low cost, enabling the system to move beyond the limits of existing long term storage solutions.

Some types of data storage devices use rotatable recording media to store and retrieve user data. The media may take a variety of forms. Hard disc drives (HDDs) and hybrid drives use an integrated stack of one or more magnetic recording discs that store data in the form of magnetically detectable patterns. Optical drives use removable optical recording discs (e.g., DVD, Blu-Ray, etc.) which store data in the form of optically distinctive marks and spaces (e.g., pits and lands, etc.). Other forms of rotatable discs are known as well, such as magneto-optical (MO) discs, etc. The discs may be rewritable, write-once or prerecorded (read only).

Each of these and other forms of rotatable data storage media are provided with one or more recording layers adapted to store data using a corresponding data transducer. The transducers are radially moveable elements that are controllably positioned across the layers to access the data from tracks defined in the recording layer. The transducers include read elements which are used to read data blocks of data. For writable discs, the transducers include a write element to write data to the associated layer(s).

The write elements generally operate to apply a write beam of electromagnetic radiation with an intensity sufficient to impart a change of state to the recording layer. The write beam may take the form of a magnetic field in the case of a magnetic disc, a light beam of collated light of selected frequency (e.g., a laser) in the case of an optical disc, etc. Some magnetic media use HAMR (heat assisted magnetic recording) where a laser diode or other element imparts localized energy (e.g., a light beam) to heat the media and lower the magnetic coercivity of a region being written using a magnetic coil. Other arrangements can be used as well, such as MAMR (microwave assisted magnetic recording).

A so-called WORM (write once, read many) drive is a specialized form of data storage device with specifically defined write capabilities. Generally, a WORM drive employs a write protection scheme such that data can be written to the media, but once written, the data cannot be modified. This provides an assurance to the user that data cannot be tampered with once the data have been written to the device.

A variety of WORM drive configurations using rotatable storage discs have been proposed in the art. Some configurations provide the write protection at the media level, such as in the case of write-once (WO) recording discs that can only be physically written once. An example is a recordable optical disc with an optically responsive embedded recording layer.

By selectively impinging the WO layer with a high powered write beam, optically detectable marks and intervening spaces can be formed along a spiral track. An optical read beam can be used during a subsequent read operation to detect the boundaries of the marks and spaces as a sequence of symbols of selected length, and the symbols can be translated back to the originally written set of data. The system is generally configured to write all the data to the recordable optical disc at once, after which certain processing is carried out, such as the generation and writing of a table of contents, which prevents subsequent attempts to write additional data to the disc (including overwriting of existing data).

While WO media such as recordable optical discs have been found useful, it has proven difficult to configure a magnetic recording layer with similar WO capabilities due to the inherent magnetic capabilities of a magnetic recording layer.

Another configuration of WORM drives provide write protection at the storage device controller level, rather than at the media level. This type of system can be applied to multiple media types. In this scheme, the controller performs a gateway function upon new data blocks that have been presented by a host for writing to the media. The gateway function will evaluate the data blocks for certain characteristics which, if present, results in a rejection of the data blocks from being written.

In this type of WORM drive, a logical volume may be established for the device over a certain range of logical addresses (such as logical block addresses, or LBAs) that are assigned to corresponding data blocks. Each LBA can only be written once. The controller tracks the LBAs that have been written and rejects an attempt to write a data block with the same LBA value that has already been written. Other controller based schemes have been proposed as well.

While these and other WORM drive approaches have been found operable, there remains a continued need for a low cost WORM drive that provides efficient write protection to a rotatable data storage medium.

Various embodiments of the present disclosure provide a method and apparatus for write protection in a WORM drive. As explained below, some embodiments provide the WORM drive with at least one rotatable data recording layer and an associated data transducer. The data transducer includes a write element and a read element. The write element is configured to write data to the data recording layer, and the read element is configured to read the data back from the data recording layer.

When a WORM mode of operation is enacted, a control circuit of the storage device physically disables the write element for the associated data recording layer. The disabling of the write element ensures the data on the data recording surface cannot be overwritten or otherwise modified. The read element can continue to access the data stored to the layer as required even after the write element has been disabled.

In some embodiments, the data recording layer is a magnetic recording layer in a rotatable magnetic recording disc, although other forms of media, including optical media, etc. may be used. For a magnetic layer, the write element includes a magnetic write coil. In some embodiments, the write element is disabled by inducing physically damage that renders the write element inoperable. In other embodiments, a fusible link is opened to prevent write currents from reaching the write element. In still other embodiments, selection circuitry used to select the write element is damaged to prevent successful interconnection with the write element. In still other embodiments, an associated HAMR element is disabled so that the write element has insufficient field strength to change the magnetic orientation of the recording layer.

The WORM mode of operation can be enacted under various conditions. In some embodiments, the write element is disabled once the associated recording layer has accumulated a total amount of stored data that reaches a predetermined threshold amount (including full capacity or less than full capacity). In other embodiments, the WORM mode of operation is enacted responsive to a host command. All of the recording layers in the storage device can be converted to WORM layers at the same time, or this can be carried out in succession over time.

It will be appreciated that once a layer becomes a WORM layer, it is not generally possible to convert that layer back to a layer capable of being rewritten or accepting new data, unless the medium is physically removed from the storage device and mounted in a new environment using a new head, or a new head is installed into the existing data storage device, etc. Cryptographic security features are disclosed in further embodiments to prevent or at least detect the writing of data to the disc in such cases.

It follows that at least three (3) different WORM modes are contemplated by the present disclosure, each of which can be implemented in accordance with the following discussion. Other modes will readily occur to the skilled artisan so that this list is merely exemplary and is not limiting.

A first worm mode referred to as Worm(1) generally operates the device to write data once, after which the write elements are disabled and the device becomes a read-only device after that. Worm(1) is suitable for a number of different applications, such as security, archiving or commercial library uses.

Worm(1) drives may operate in a data archival situation where data sets from a large storage system are copied to the device(s). Once the data have been transferred and the drive capacity has been filled, the write elements are disabled to ensure data retention. Worm(1) drives may also be used in library applications where selected content is loaded to the disc surfaces using an authorized process, such as a library of audio/visual (AV) works such as movies, etc. Once loaded, the write elements can be disabled to preserve the loaded content.

A second mode is referred to as Worm(2). Worm(2) is similar to Worm(1) but generally involves establishing a special connection to a drive controller to control the drive head(s). Absent this connection, the writing of data cannot be performed. In this scenario, the data cannot be loaded without this connection, and once loaded, the data will not be able to be changed based on the subsequent disabling of the write elements based on the lack of the connection. In some cases, a special security feature such as an encryption key or other credential is required to be supplied to the device in order to enable the write function.

A third mode is referred to as Worm(3). Worm(3) is similar to those discussed above, but may involve operation of the device as a normal HDD for some selected amount of time before the disabling of the write element(s), so that the data written to the disc surfaces become read-only surfaces from that point forward. For example, a security application using Worm(3) might include a surveillance camera that repetitively overwrites video/audio frames of data to the disc surfaces. At such time that a security event takes place, the write element(s) can be disabled, thereby enabling the data to be permanently captured for further evaluation.

Time or datestamp information can be appended as required in any of these or other modes when the transition is made to worm mode. The following discussion will provide various embodiments that can be adapted to fit any of these or other modes as desired.

Figure 1:
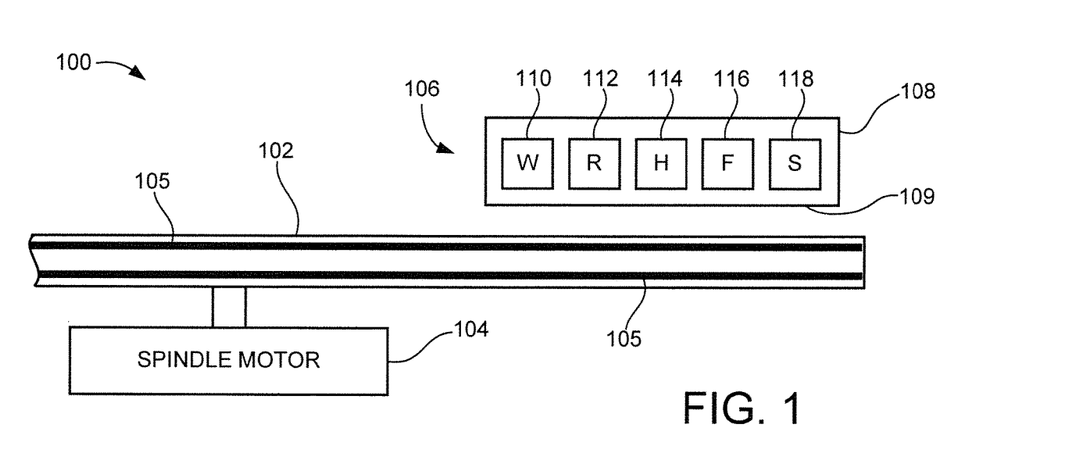
FIG. 1 shows a head/media combination of a data storage device constructed and operated in accordance with some embodiments.

FIG. 1 which shows aspects of a data storage device 100 in accordance with various embodiments of the present disclosure. The device 100 incorporates rotatable data storage media such as in the case of a hard disc drive (HDD) or a hybrid drive, although other forms of media can be used.

In the example of FIG. 1, one or more data recording media 102 in the form of magnetic recording discs are provided to store user data from a host device. The discs are axially aligned and rotated by a spindle motor 104 at a constant high speed. Each disc has one or more magnetic recording layers 105 configured to magnetically store data.

It is contemplated that the disc 102 has both upper and lower recording layers on the opposing upper and lower sides of the disc as shown, although only the upper layer 105 is of interest in FIG. 1. Some magnetic recording discs use three-dimensional (3D) recording with multiple stacked magnetic recording layers embedded within the disc structure that are accessed using a penetrative write mechanism such as MAMR (microwave assisted magnetic recording). Similarly, certain types of optical discs may have multiple embedded recording layers. For ease of discussion, recording layers such as 105 may also be referred to as recording surfaces, and it will be understood that this may not necessarily refer to the outermost physical surface of the associated disc.

A data transducer 106 is controllably positioned adjacent the recording surface 105 of the disc 102. The transducer 106, also referred to as a head, includes a slider 108 with an air bearing surface (ABS) 109 configured to support the slider 108 in close relation to the disc 102 using fluidic atmospheric currents established by high speed rotation of the disc.

The slider 108 supports a write element (W) 110 to write data to the recording surface 105 and a read sensor (R) 112 to subsequently read back the previously written data. The write element may take the form of a perpendicular writing coil and the read sensor may be a magneto-resistive (MR) sensor, although other configurations can be used. Other elements can be incorporated into the slider 108, including but not limited to a heat assisted magnetic recording (HAMR) system (H) 114, a fly height adjustment mechanism (F) 116 and one or more contact sensors (S) 118.

Figure 2:
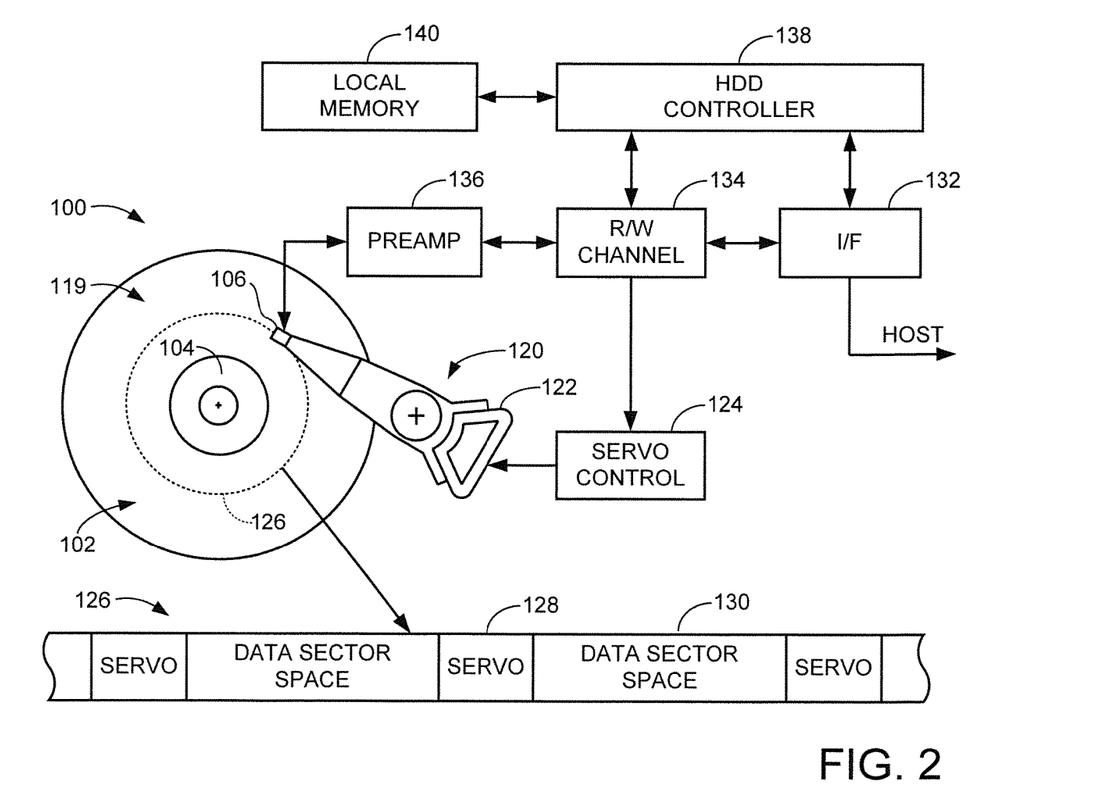
FIG. 2 is a functional block representation of aspects of the data storage device of FIG. 1.

FIG. 2 shows the storage device 100 of FIG. 1 in greater detail. The magnetic recording medium 102 is clamped to and rotated by the spindle motor 104 about a central axis. Multiple discs 102 may be axially mounted in a spaced apart relation to form a disc stack 119, with each disc providing opposing upper and lower recording surfaces. A corresponding transducer 106 is provided for the storage of user data to each surface.

An actuator 120 is disposed adjacent an outermost peripheral edge of the disc 102 to support the transducers 106. The actuator 120 pivots about a pivot point to radially advance the transducers 106 across the respective data recording surfaces 105 through application of current to a voice coil 122 of a voice coil motor (VCM) by a servo control circuit 124. This operation aligns a particular transducer with a corresponding data track on the associated recording surface.

One such data track is denoted at 126. The track 126 is depicted as a concentric track, but other forms of tracks may be used such as spiral tracks, shingled tracks, etc. An embedded servo arrangement is used in which spaced apart servo fields 128 provide servo positioning information to the servo control circuit 124. Data sectors 130 are written along each track 126 in the space between adjacent pairs of the servo fields 128. The data sectors each store a fixed amount of user data, such as 512 bytes (B), 1024B, 4096B, etc.

A data transfer circuit extends between the transducers 106 and the external host device having an interface (I/F) circuit 132, a read/write (R/W) channel 134 and a preamplifier/driver (preamp) circuit 136. The data transfer circuit operates to direct a transfer of user data between the data recording surfaces 105 of the discs 102 and the host device responsive to data access commands issued by the host device.

A top level HDD controller circuit 138 provides top level control of the storage device. The controller 138 incorporates a hardware processing circuit and/or one or more programmable processors that execute program instructions (e.g., firmware) stored in a local memory. Local memory 140 provides buffering and cache functions during data transfers. The memory may be volatile memory such as in the case of SRAM, DRAM, etc., non-volatile memory such as flash memory, etc., or a combination of both.

Figure 3:
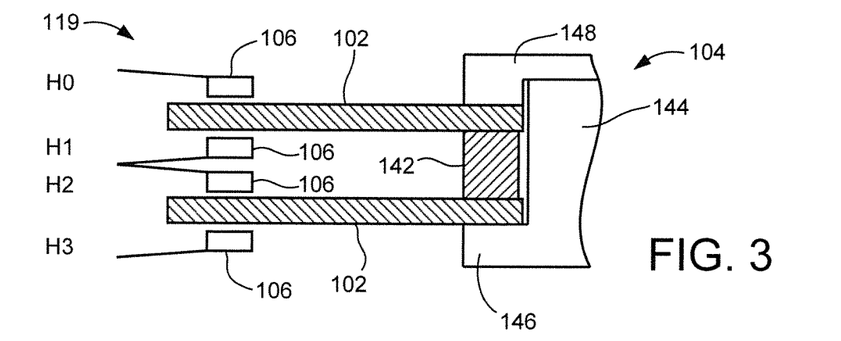
FIG. 3 shows a disc stack and corresponding transducer array of the device of FIG. 2 in some embodiments.

FIG. 3 shows a side elevational depiction of the disc stack 119 from FIG. 2 in some embodiments. In this example, the disc stack has two (2) rotatable discs 102 and four (4) data transducers (heads) 106. The heads are denoted from H0 to H3. An intervening disc spacer 142 establishes an appropriate inter-disc spacing between the discs 102.

The spindle motor 104 (FIG. 2) includes a rotatable disc hub 144 with a radially projecting, annular disc support flange 146. A disc clamp 148 attaches to the top portion of the hub 144 to clamp (compressively retain) the discs to the hub. Head selection circuitry in the preamp 136 (FIG. 2) can be used to individually interconnect a selected one of the heads 106 to the data transfer circuit path and transfer data with an associated recording layer.

Figure 4:
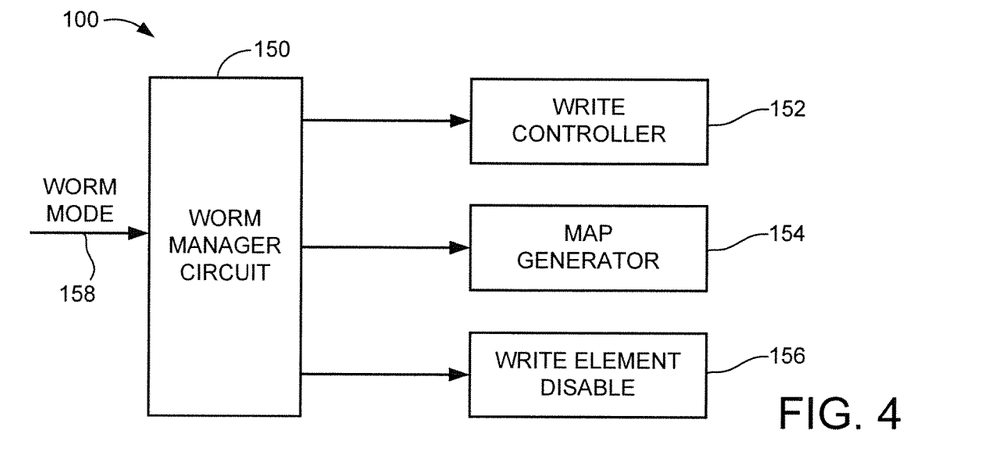
FIG. 4 shows a WORM (write once read many) data management circuit of the data storage device in some embodiments.

FIG. 4 depicts a WORM (write once, read many) data manager circuit 150 of the storage device 100. The WORM circuit 150 may form a portion of the HDD controller 138, or may be a separate circuit, and may be implemented using one or more hardware circuits and/or programmable processors that execute corresponding firmware. The WORM circuit 150 is operably coupled to, and directs, the respective operations of a write controller 152, a map generator 154 and a write element disable circuit 156. The functions of each of these circuits will be discussed below.

The WORM circuit 150 implements a write-once data protection policy for the storage device 100. Under this policy, two modes of operation are available for each recording layer: a normal mode and a WORM mode. These respective modes can be implemented concurrently for all of the recording layers in the storage device at the same time, or can be individually implemented at different times.

During normal mode, the storage device 100 maintains both write capability and read capability for the associated recording layer. That is, during normal mode the device stores user data to the respective recording layer, and reads the user data that have been previously stored. These write and read operations are carried out in response to access commands supplied by the host.

Depending on the configuration of the drive, the normal mode can be performed to either allow data to be rewritten multiple times to a given location in the layer, or to prevent the overwriting of previously written data so that data are only written once to each location in the layer. In the former case, the storage device operates as a normal (write many, read many) drive. In the latter case, the WORM circuit 150 directs the write controller 152 to write all newly received data to new (pristine) locations on the discs. In both cases, the map generator 154 generates and maintains a map of the locations of data throughout the system during such processing.

During WORM mode, the associated write element (e.g., 110, FIG. 1) for the recording layer 105 is disabled by the write element disable circuit 156 so that the recording layer loses further write capability but retains read capability. This prevents the data stored to the recording layer from being subsequently modified or overwritten. The previously written data can continue to be read by the read element (e.g., 112, FIG. 1). It will be apparent that once a particular recording layer has transitioned to WORM mode, the layer cannot be transitioned back to normal mode without removing the medium from the storage device, installing a new head, etc.

The point at which the WORM circuit 150 transitions each recording layer to the WORM mode can vary depending on the configuration of the system. In some embodiments, each recording layer receives data for storage in the various data sectors 130 (FIG. 2) until the total amount of data stored to the recording layer reaches a predetermined amount. The predetermined amount may be the full capacity of the layer, or some other reduced value. In this case, once the amount of data has been stored, the WORM circuit 150 proceeds to disable the associated write element.

In other embodiments, the WORM circuit 150 can be arranged to receive a specially configured command from the host device to implement the WORM mode, as indicated by the WORM command received on path 158. The command may be directed to the entire drive so that all of the write elements are disabled, or only a single/subset of the recording layers are transitioned. Other sources for WORM mode commands may be used as well.

Figure 5A:
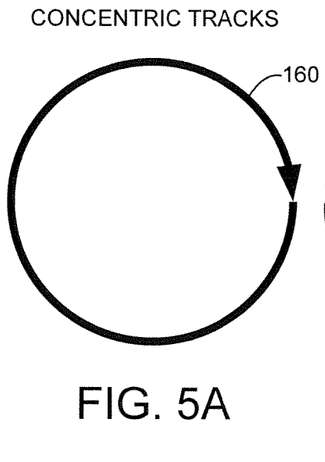
FIGS. 5A, 5B and 5C illustrate different types of data tracks that can be written by the management circuit of FIG. 4 in various embodiments.

The manner in which data are written to the storage device 100 can influence the implementation of the write protection policy. FIG. 5 shows a concentric path 160 taken by the transducer 106 to follow a concentric (ring shaped) track on the associated surface. This is carried out during a track following mode of operation where the actuator 120 (FIG. 2) is nominally maintained at a fixed radius using the servo data from the servo fields 128. This path corresponds to the concentric track 126 depicted in FIG. 2.

When the data tracks are concentric, the data can be written in cylinders of tracks all at the same radius on the respective layers. With reference again to FIG. 3, high speed, sustained data transfers can be made by selecting head H0 and writing a full track's worth of data to a first track, performing a head switch operation to H1 and writing a full track's worth of data to a second track, and so on. Once all four heads H0-H3 have written an associated track, the entire actuator can be advanced one track width and the process can be repeated beginning with head H4. Other multi-surface write strategies can be used.

Figure 5B:
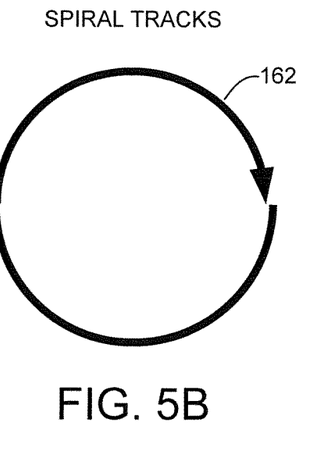

FIG. 5B shows a spiral path 162 taken by a selected head 106 in other embodiments. During spiral writing, the actuator gradually and continuously advances the transducer to write a continuous spiral, formed of spiral tracks. An advantage of spiral track writing is that it largely eliminates the need for head switches and short one-track seeks. Rather, it is more efficient when writing spiral tracks to maintain one active head (such as H0) in operation before switching to other heads. Spiral tracks are particularly useful when streamed sequential data sets are being recorded.

Figure 5C:
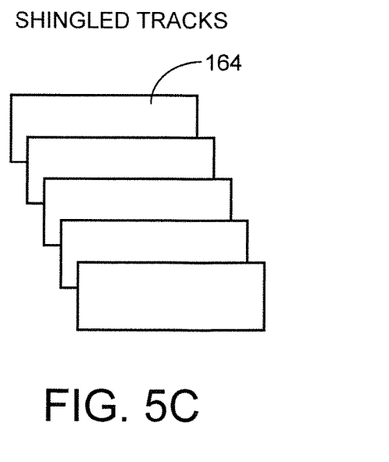

FIG. 5C shows yet another track configuration that involves the use of shingled magnetic recording (SMR). SMR involves writing a sequence of partially overlapping (shingled) tracks 164. Shingled tracks are written by writing a first track, followed by partially overlapping each subsequently written track to form a band of shingled tracks.

SMR takes advantage of the fact that, usually, the effective write width of the write element 110 is wider than the effective read width of the read sensor 112. Shingling the tracks thus increases the total data storage capacity of the surface, allowing more data to be stored per layer. One disadvantage of SMR is that to rewrite data on an intermediate track within a given band, the entire band of tracks may need to be read and written back to the layer. This is less of a concern in a WORM environment where data are only written once.

Figure 6:
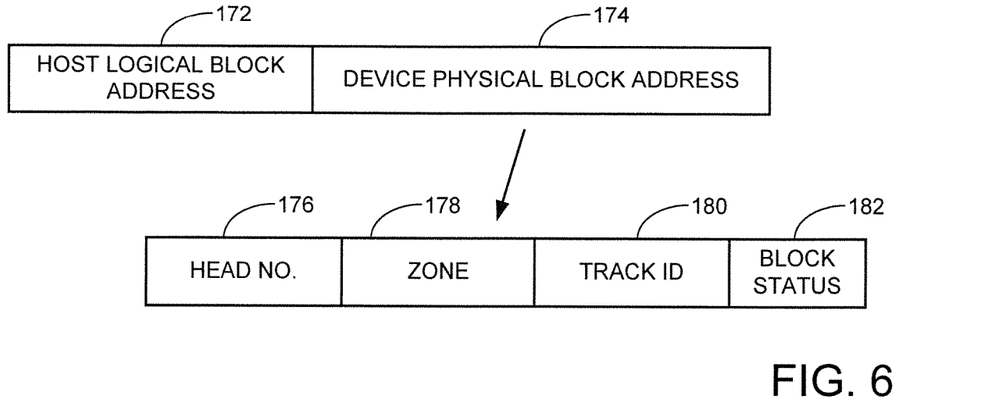
FIG. 6 shows an exemplary format for a map structure generated by the circuit of FIG. 4 in some embodiments.

FIG. 6 provides a generalized format for a map 170 generated and maintained by the map generator 154 (FIG. 4) during operation of the storage device. The map is used both during normal mode and WORM mode. The map 170 is maintained as a data structure in a local memory, such as the local memory 140 in FIG. 2, to enable the storage device to locate various blocks of data that have been written, as well as other information such as the status of the blocks, etc. It will be appreciated that the format in FIG. 6 is merely for purposes of illustration and is not limiting.

The map 170 includes a host logical block address (LBA) field 172 and a device physical block address (PBA) field 174. This serves as a transition layer to convert host level logical addresses to device level physical addresses. The PBA field 174 can include various fields including a head no. field 176, a zone field 178, a track ID field 180 and a block status field 182.

The head no. field 176 denotes which head (such as heads H0-H3 from FIG. 3). When used, each recording layer may be divided up into one or more zones (or bands, etc.), and these zones or other subdivisions are reflected in the zone field 180. The track ID field 180 stores a radial track number, and the block status field 182 can be used to provide a status for the associated block, such as a valid/invalid flag, etc.

As with normal data storage devices, the map structure may be multi-level, may involve different formats, etc. Nevertheless, the map structure is normally stored in an up-to-date form in non-volatile memory (NVM) such as in a dedicated location on the various discs, a separate NVM semiconductor memory (e.g., flash, etc.). Portions of the may be loaded to the local memory 140 as required during operation.

It will be apparent that, for a given recording layer, the map will continue to be updated with new entries so long as data continue to be written to that layer. On the other hand, once the layer has transitioned to WORM status so that data updates are no longer being provided to the layer, the map becomes fixed and is no longer altered at least with respect to the physical locations of the data blocks.

Figure 7:
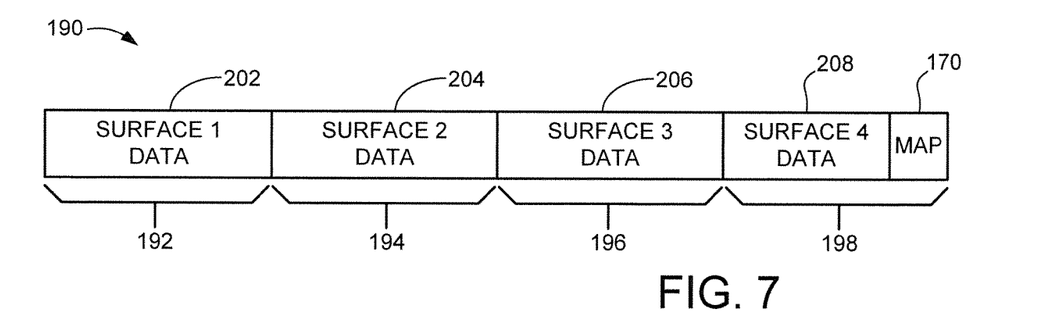
FIG. 7 shows an arrangement of user data and map data on the respective data recording surfaces of FIG. 3 in some embodiments.

It follows that in at least some embodiments, the device 100, when being transitioned to a fully configured WORM device (e.g., all recording layers are WORM layers), the map is written to the discs and thereafter used for accesses. FIG. 7 shows one configuration 190 in which the map 170 is written as a consolidated map in a single location (not including duplicate copies if used, etc.) within the disc stack.

FIG. 7 is a layout of the storage space of the four recording layers (surfaces) discussed above in FIG. 3. The respective recording layers correspond to the recording layers 105 in FIG. 1 and are designated as 192, 194, 196 and 198, respectively. Each layer represents, generally, the same total amount of overall data storage capacity.

The associated data that are written to each of the layers 192, 194, 196 and 198 are identified by blocks 202, 204, 206 and 208, respectively. These are referred to as Surface 1

Data to Surface 4 Data. The first three surfaces 192, 194 and 196 each generally store a first total amount of user data (more or less), and the fourth surface 198 stores a second, lower amount of user data to the extent that it accommodates the map 170. Of course, other parameters and control data such as firmware, channel settings, etc. may also be stored in a suitable location among the discs as well. Regardless, the configuration of FIG. 7 places all of the map data 170 on the fourth layer 198, and read operations to read data from each of the respective layers will generally require accessing the map stored on the fourth layer.

Figure 8:
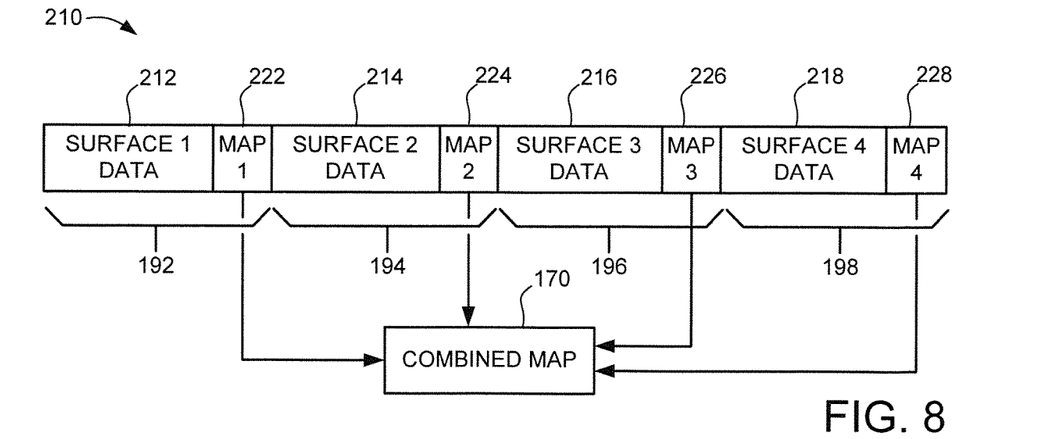
FIG. 8 shows an alternative arrangement of user data and map data on the respective data recording surfaces of FIG. 3 in further embodiments.

FIG. 8 shows another alternative configuration 200 in which the map 170 is distributed among the respective surfaces 192, 194, 196 and 198. That is, the respective layers include associated surface data 212, 214, 216 and 218, and corresponding map portions 222, 224, 226 and 228. Each map portion provides the associated map information for the data stored in that layer; for example, in the first recording layer 192, the Map 1 portion 222 provides the map information for the data blocks in the Surface 1 Data 212, and so on. In this scheme, when a read operation is carried out for a specific layer, the associated map data on that layer is accessed as required to locate the requested data.

The respective map data structures (e.g., 170 in FIG. 7, 222-228 in FIG. 8) may be written to any suitable locations on the respective layers, such as an outer guard band. The map data may be duplicated, further distributed across the media for individual zones, etc. as required. In some cases, map data for a first recording layer may be stored on a different, second recording layer, and so on.

It will be recalled that the WORM manager circuit 150 directs the write element disable circuit 156 from FIG. 4 to disable a selected write element to convert the corresponding recording layer to WORM status. The operation of the write element disable circuit 156 will now be discussed with reference to FIGS. 9A through 9C.

Figure 9A:
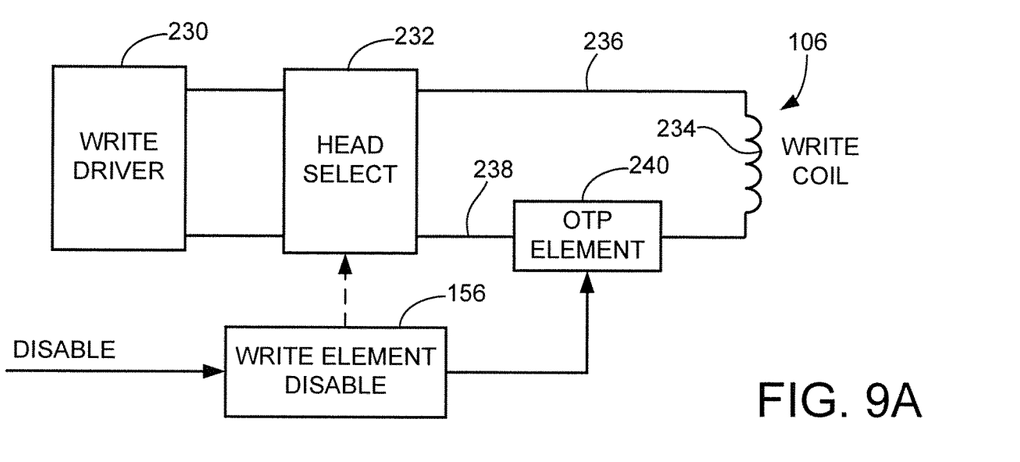
FIGS. 9A, 9B and 9C show alternative operations of the write element disable circuit of FIG. 4 in different embodiments.

FIG. 9A shows a first embodiment wherein the write element disable circuit 156 operates to disable a write element of a selected head 106 by severing an electrical connection between the write element and the rest of the system. A write driver circuit 230 generates time-varying, bi-directional write currents to write data to the associated layer. The write currents are passed to a head selection multiplexor (mux) 232. The mux 232 may be disposed in the preamp 136 and is arranged to receive head selection inputs to select among the respective heads H0-H3.

The associated write element includes a write coil 234 which is interconnected to receive the write currents from the mux 232 via conductive paths 236 and 238. An OTP (one-time-fuse) element 240 is placed in series with one of these conductive paths (in this case, path 238).

In response to receipt of a disable signal from the WORM manager circuit 152, the write element disable circuit 156 activates the OPT element 240 to cause an open circuit condition in conductive path 238. This prevents subsequently applied write currents from the mux 232 to reach the write coil, and no further magnetic write fields can be applied to the medium. As noted previously, the WORM manager circuit 152 generates the disable signal based on a number of inputs, such as an external host command, an indication that a data level in the recording layer has reached a predetermined threshold, an alarm condition that necessitates freezing the storage device in its current storage condition, etc.

In an alternative embodiment, as shown in FIG. 9A the write element disable circuit 156 can change a setting of the mux 232 so that the selection input used to select the write coil 234 can no longer physically interconnect the write driver 230 with the coil. Other configurations that provide upstream disruptions in connectivity are contemplated as well; for example, in a situation where each coil receives a separate write driver, the write driver for the coil being disabled can be rendered inoperative, etc.

Figure 9B:
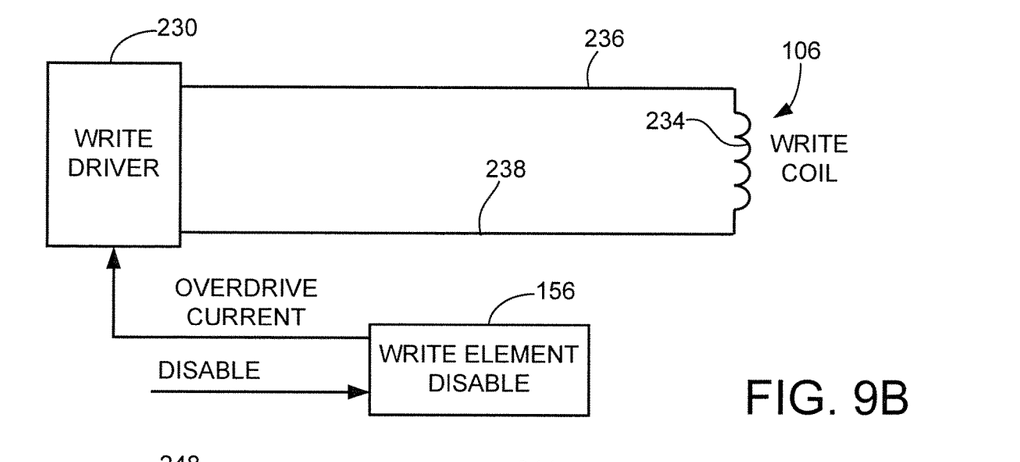

FIG. 9B shows another embodiment in which the write element disable circuit 156 operates to disable the selected write coil 234. In this case, the write element disable circuit 156 provides a drive input signal to the write driver 230 to purposefully supply an overdrive current to the write coil 234. The overdrive current may be a steady state current of sufficient magnitude and duration as to induce physical damage to the write coil, such as burning an open circuit within the coil. Confirmation that the coil has been rendered inoperative can be made by subsequently attempting to supply a current and detecting an open circuit (large impedance) condition.

Figure 9C:
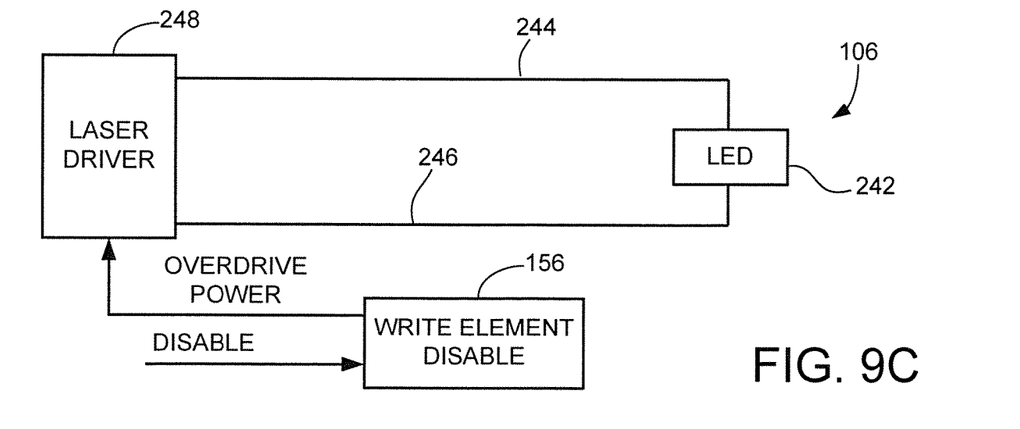

FIG. 9C shows yet another embodiment for a write element 102 having a laser emitting diode (LED) 242 as a source of electromagnetic radiation that heats a localized portion of the recording layer during heat assisted magnetic recording (HAMR) processing. In this case, the LED 242, or other source of electromagnetic radiation, locally heats the media to a temperature near or above the Curie temperature for that material. This lowers the magnetic coercivity of the media sufficiently to enable the field strength of the write coil 236 to set the magnetization to a desired pattern.

The LED 242 is supplied with electrical power (voltage, current) via conductive paths 244, 246 from a laser driver circuit 248. Hence, to disable the write element, the write element disable circuit can supply an overdrive power input to cause the laser driver circuit 248 to overdrive, and thus permanently damage, the LED 242. Alternatively, the variations of FIGS. 9A and 9B can be supplied to the configuration of FIG. 9C, such as forming an open condition in one of the conductive paths 244, 246, by disabling the laser driver 248, etc.

Figure 10:
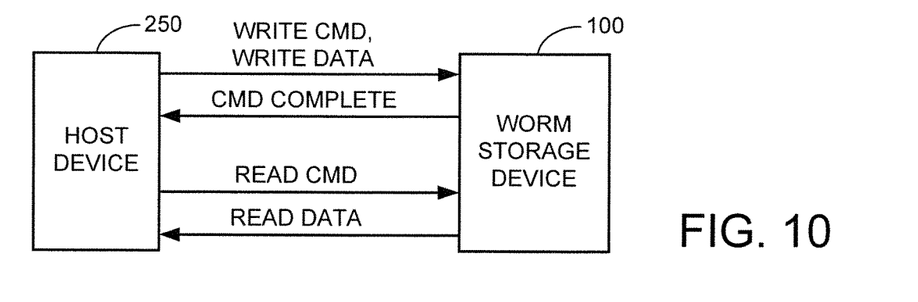
FIG. 10 shows communications between the WORM storage device and a host device in some embodiments.

The manner and phasing at which the storage device 100 renders the drive as a WORM drive can vary depending on the requirements of a given application. FIG. 10 shows one operational environment in which the storage device 100 is coupled to a host device 250. The host device 250 operates to transfer data with the storage device 100 by issuing write commands and read commands.

A write command will generally include a command to write certain logical blocks, such as a range of LBAs, along with the actual blocks of data to be written. The storage device 100 operates as described in FIG. 2 to write the input data blocks to an appropriate location on an appropriate recording layer, and return a command complete indication back to the host. In similar fashion, read commands are issued by the host device 250 for one or more blocks having associated logical addresses, and the device 100 will schedule a read operation to recover the requested data and return the data to the host. Of course, once the drive has been fully configured as a WORM drive, further write commands will be rejected, and only read commands will be accepted and serviced.

The storage device 100 can be configured as a Worm(1), Worm(2) or Worm(3) drive as desired to store the user data from the host device 250. In some cases, special security credentials may be required from the host device in order to enable writing of the data. Irrespective of mode, once transitioning to the worm status (e.g., read-only status), the last write provided to the device may include a timestamp or other types of control data to indicate the time and circumstances by which worm mode was entered (e.g., end of drive, host initiated, security breach, etc.). If host authorization is required to authorize the writing of data, then the disable signals in FIGS. 9A-9C can be viewed as "enable-low" signals (e.g., normally disabled unless an enable is externally supplied through presentation of the appropriate credentials).

The rate at which the device 100 fills with data will be governed by the rate at which the data sets are supplied by the host device 250. It is therefore contemplated that, in some embodiments, the device 100 will operate as a normal storage device until such time that the drive approaches a full condition, at which point the drive can be configured to request whether the user of the host device 250 wishes to convert the drive to a WORM drive. In other cases, the conversion can take place without user notification or request for permission.

It should be noted that, during normal mode processing, the device 100 can be configured to assign LBAs to selected PBAs (data sectors 130), so that updated blocks are overwritten in place as with a conventional drive. For archive purposes, the drive can instead be configured to write updated blocks with the same LBA values to new locations, and provide the map structure with a series of forward pointers or other information to enable the system to locate the most current version of the block (or any intermediate version if desired).

Figure 11:
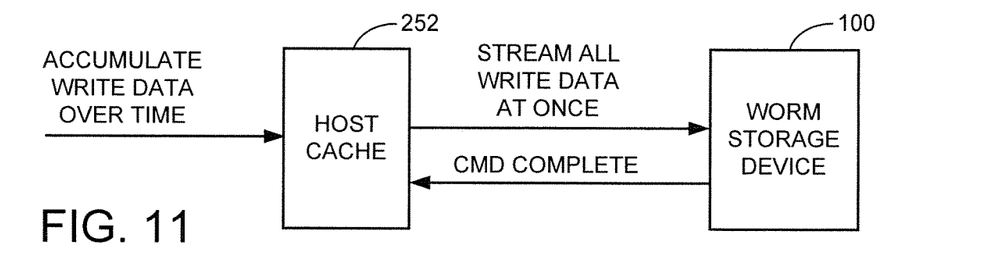
FIG. 11 shows alternative communications between the WORM storage device and the host device in further embodiments.

FIG. 11 shows an alternative configuration for the storage device 100. In this case, the write data are all presented to the storage device 100 at once, so that the storage device is filled substantially at the rate at which it can receive new data. Write data from another location within a larger data management system can be directed to and accumulated within a host cache memory 252. The system proceeds to direct the writing of the data in sequence until the storage device 100 is filled, after which the WORM manager circuit 150 disables the write elements 110 and converts the drive to a WORM drive.

Figure 12:
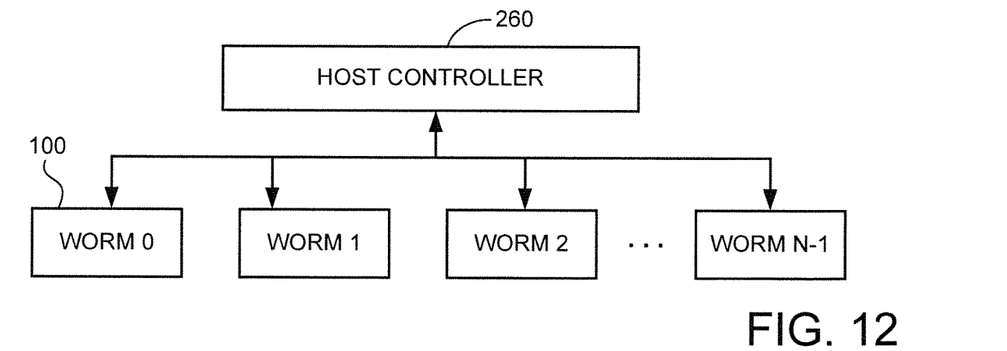
FIG. 12 shows a multi-device data storage array formed of WORM storage devices in some embodiments.

The system in FIG. 11 is particularly suitable in a large data processing environment where accumulated data are identified and grouped together for write protected cold storage in a group of devices, such as illustrated in FIG. 12.

FIG. 12 shows a host controller 260 in conjunction with a plural number N of WORM drives 100. This illustrates that the host controller 260 can utilize multiple storage devices 100 to provide a write protected storage space, which can be useful for a number of applications, including security and archival purposes.

Figure 13:
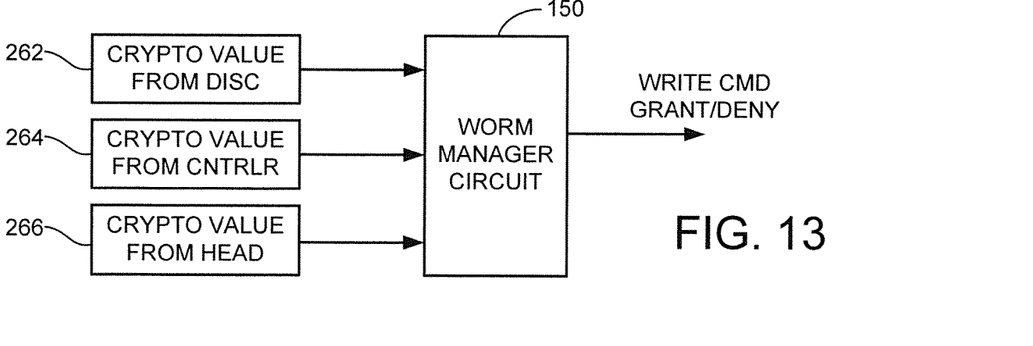
FIG. 13 shows a further embodiment of the WORM data management circuit.

FIG. 13 illustrates that additional security features can be provided within the storage device 100 as required to ensure the data integrity of data written to the respective recording layers. In some cases, cryptographic values used in one or more cryptographic algorithms can be stored in various locations with the device. The cryptographic values can include hashes, encryption keys, encoded values, etc.

FIG. 13 shows the use of a first cryptographic value 262 that is stored to each recording layer and/or disc. A second cryptographic value 264 may be stored in the controller circuit 138 (FIG. 2). A third cryptographic value 266 may be stored or otherwise incorporated into each head. Not all of these values need be used, and other values may be stored elsewhere as required.

The various values can be supplied as inputs to the WORM manager circuit 150, or other circuitry, in order to grant or deny write operations as required. In this way, for example, a motivated attacker who attempts to remove a given storage disc 102 and install the disc into a different, nominally identical storage device, or to access the disc on a separate spin-stand, etc., will need the cryptographic value from the original data storage device 100 in order to operate. For example, the data on a given recording layer 105 can be encrypted using an encryption key that is stored in the controller, another one of the discs, one of the heads, etc. Without access to this key, data still may not be able to be recovered or rewritten to the disc.

Other mechanisms can be used as well to establish the provenance of write protected data on a given medium, such as time/date stamps, etc. External keys or other credentials may be tied to a particular write operation, and such credentials may be required to subsequently read the data.

Figure 14:
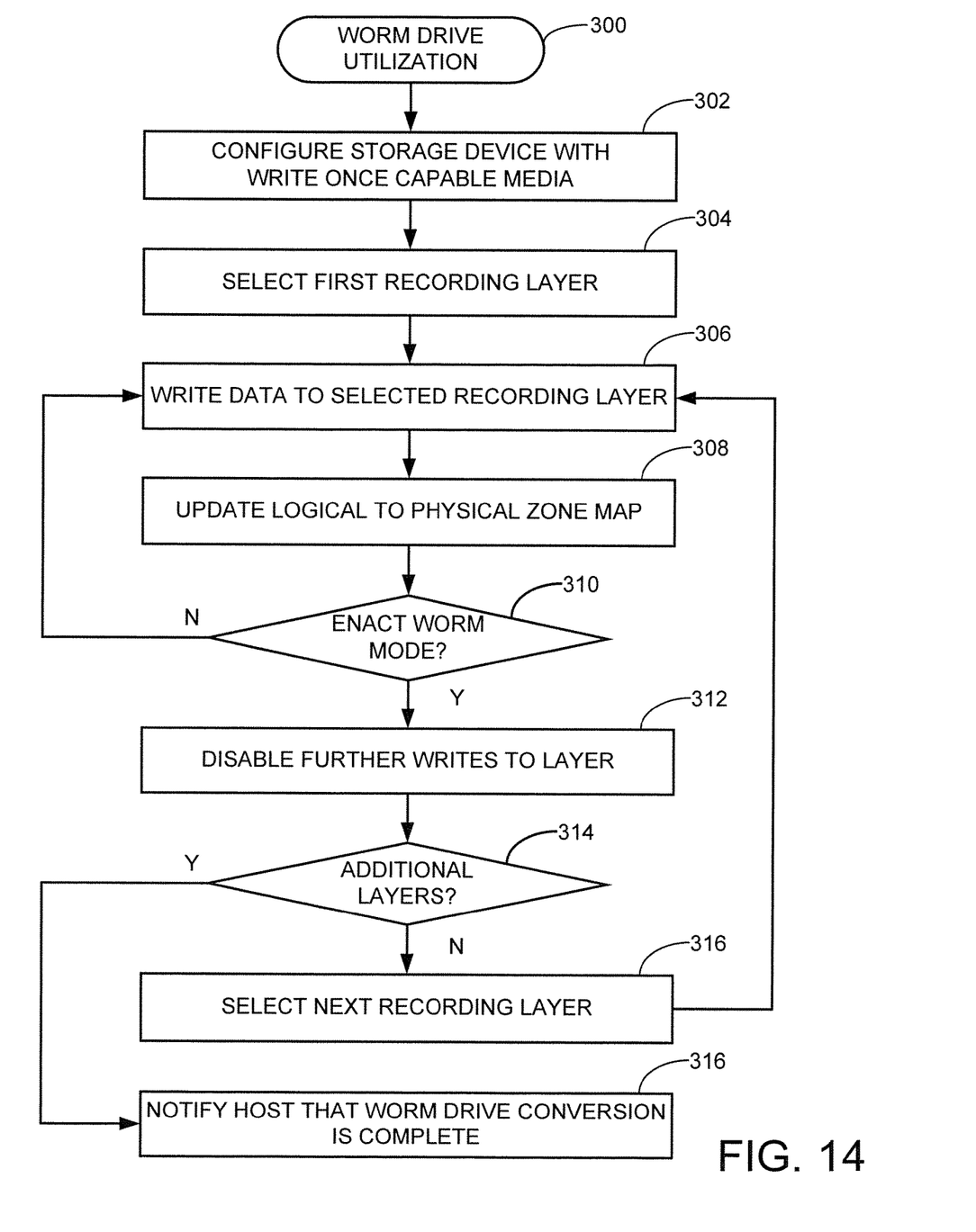
FIG. 14 shows a flowchart for a routine carried out by some WORM storage devices of the present disclosure in accordance with various embodiments.

FIG. 14 shows a flow chart for a WORM drive utilization routine 300 illustrative of steps that may be carried out in accordance with some embodiments. Other steps may be carried out in addition to, or in lieu of, these steps, so this is merely illustrative and not limiting. Generally, the flow describes the general transition of a selected storage device 100 to a WORM drive using the sequential flow of FIG. 11. However, the flow can be readily adapted for other work environments.

Step 302 commences with providing the storage device 100 with write once capable media (e.g., discs 102). It is noted that the media may be physically capable of only being written once, as in the case of many types of recordable optical discs, or may be capable of being rewritten many times, as is the case of most magnetic recording discs. The WO capability comes from the corresponding circuitry as discussed above that prevents the storage device from further writing once the decision is made to transition to WORM mode.

At this point it will be noted that some types of write once media can readily be used with the various embodiments of the present disclosure. Even if a given disc cannot be erased, it still could potentially be overwritten with data that masks or otherwise renders useless the underlying data. For example, an optical disc with a layer of photo-reactive material adapted to change color (and hence become optically detectable, etc.) could be subjected to a write command by an unscrupulous attacker that exposes the entire layer and wipes out all the previously written data on that layer. Hence, disabling the writing capability once the data have been safely written provides numerous benefits regarding maintaining data integrity of the stored data.

Continuing with FIG. 14, a first recording layer is selected at step 304, and write data are written to the selected layer at step 308. During the writing of these blocks of data, the map 170 is updated as required to provide an up-to-date transition layer to show logical to physical locations at step 308.

Decision step 310 determines whether WORM mode should be enacted, such as by noting that the recording layer is full, or has otherwise reached the desired capacity of data. Alternatively, decision step 310 can represent receipt of an external indication from the host to enact WORM mode, or the detection of some other event, such as an alarm, that results in a lockdown of the current state of the drive, etc. If WORM mode is not yet appropriate to enact, the routine returns so that data continues to be accumulated in the recording layer and the map continues to be updated.

Once the determination has been made to enact WORM mode for the selected layer, the routine passes to step 312 where the associated write element is disabled as discussed above.

The flow continues to decision step 314 where a determination is made whether additional layers require processing. If so, the next recording layer in the device is selected at step 316. In this way, the routine fills and converts each layer one at a time. Other alternatives, such as concurrent filling and disabling, can be used as discussed above.

Once all of the recording layers have been converted to WORM layers, the flow passes from decision step 314 to step 316 where a notification can be supplied to the host that the conversion to WORM mode is complete. Thereafter, the drive will not accept write commands, but will continue to process authorized read commands.

It will now be appreciated that the various embodiments present a number of benefits. Write protected media can be enacted for substantially any form of recordable media, including media that are inherently rewritable (such as magnetic discs). Steps can be taken to progressively establish different layers within the same storage device as WO layers while other layers remain (in some cases, permanently) fully writable and readable. Further security measures can be taken to reduce the ability of an attacker from defeating the write protection by removing the disc from a storage device.

It is believed that substantially any existing production data storage device can be modified, such as through a firmware upgrade, to add the capabilities as described herein to configure the data storage device as a WORM drive. Alternatively, a low cost, high reliability data storage device can be configured with the WORM drive capabilities, such as by incorporating write elements that have relatively short operational lives, since there is little need for long operational life for these devices once the data have been written to the various data recording layers.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A data storage device configurable as a write once read many (WORM) drive, comprising:
   a rotatable disc comprising a data recording layer;
   a data transducer selectively moveable with respect to the rotatable disc, the data transducer comprising a write element configured to write data to the data recording layer and a read element configured to read data from the data recording layer, the data written to and read from the media arranged as data blocks identified by logical addresses; and
   a control circuit configured to physically disable the write element to prevent writing of any data blocks to the data recording layer irrespective of the associated logical addresses of the data blocks responsive to a write element disable signal, the control circuit physically disabling the write element by performing at least one of opening a communication path between the write element and a write driver, damaging the write element, damaging the write driver, or damaging a switch circuit disposed between the write element and the write driver, the read element operative to continue reading data from the data recording layer after the write element is physically disabled.

2. The data storage device of claim 1, wherein the write element disable signal is generated responsive to a determination that a total amount of data stored by the data recording layer has reached a predetermined threshold.

3. The data storage device of claim 2, wherein the predetermined threshold comprises substantially a total data storage capacity of the data recording layer.

4. The data storage device of claim 1, wherein the write element disable signal is generated response to a command from an external host device coupled to the data storage device.

5. The data storage device of claim 1, wherein the control circuit disables the write element by generating an open circuit condition in a conductive path configured to supply write currents to the write element.

6. The data storage device of claim 1, wherein the control circuit disables the write element by directing an overdrive current to the write element to physically damage the write element.

7. The data storage device of claim 1, wherein the write element comprises a magnetic write coil and an electromagnetic radiation source configured to impinge a location of the data recording layer with electromagnetic radiation to enable the write coil to apply a magnetic field to change a storage state of the location, and wherein the control circuit disables the write element by disabling the electromagnetic radiation source such that the magnetic field, without the electromagnetic radiation, is insufficient to change the storage state of the location.

8. The data storage device of claim 1, wherein the rotatable disc is a rotatable magnetic recording disc, the recording layer is a magnetic recording layer, the write element comprises a write coil, the read element comprises a magneto-resistive sensor, and the control circuit operates to disable the write element by performing at least a selected one of disconnecting the write coil from a write driver used to supply write currents to the write coil, damaging the write coil, damaging the write driver, or damaging a switch circuit between the write coil and the write driver.

9. The data storage device of claim 1, wherein the rotatable disc is a first rotatable disc, the data recording layer is a first data recording layer, the data transducer is a first data transducer, the write element is a first write element and the read element is a first read element, and wherein the data storage device further comprises:
   a second rotatable disc comprising a second data recording layer, the second rotatable disc axially aligned for concurrent rotation with the first rotational disc; and
   a second data transducer selectively moveable with the first data transducer and comprising a second write element configured to write data to the second data recording layer and a second read element configured to read data from the second data recording layer.

10. The data storage device of claim 9, wherein the control circuit is configured to sequentially physically disable the first write element, direct a transfer of write data for storage to the second recording layer while the first write element is physically disabled, and then physically disable the second write element.

11. The data storage device of claim 9, wherein the control circuit comprises a map generator configured to generate a map as a data structure in a local memory, the map providing a logical to physical transition layer to describe data blocks written to the respective first and second recording layers.

12. The data storage device of claim 1, wherein in response to the write element disable signal, the control circuit prevents a data block from being written to the data recording layer having a logical block address that has not previously been used with any other data block written to the data recording layer.

13. The data storage device of claim 11, wherein the control circuit divides the map into a first map portion that describes the data blocks written to the first recording layer and a second map portion that describes the data blocks written to the second recording layer, and wherein the control circuit further directs a writing of the first map portion to the first recording layer prior to the physical disabling of the first read element and directs a writing of the second map portion to the second recording layer prior to the physical disabling of the second read element.

14. A method for configuring a data storage device as a write once read many (WORM) drive, comprising:
  storing selected write data to a data recording layer of a rotatable disc using a data transducer selectively moveable with respect to the rotatable disc, the data transducer comprising a write element configured to write the selected write data to the data recording layer and a read element configured to subsequently read back the selected write data from the data recording layer;
  receiving a write element disable signal;
  physically disabling the write element to prevent writing of any additional write data to the data recording layer responsive to the write element disable signal, the write element physically disabled by performing at least one of opening a communication path between the write element and a write driver, damaging the write element, damaging the write driver, or damaging a switch circuit disposed between the write element and the write driver; and
  using the read element to read the selected write data from the data recording layer after the write element is physically disabled.

15. The method of claim 14, further comprising generating a map as a data structure in a local memory that describes data blocks stored to physical locations within the data recording layer by logical addresses utilized by a host device, and storing the map to the data recording layer prior to the physical disabling of the write element.

16. The method of claim 14, wherein the rotatable disc is a rotatable magnetic recording disc, the recording layer is a magnetic recording layer, the write element comprises a write coil, and the read element comprises a magneto-resistive sensor.

17. The method of claim 14, wherein the selected write data is arranged as a series of fixed-sized data blocks each having an associated logical address, wherein the data recording layer stores both a prior version and a current, updated version of a selected data block having an associated logical address.

18. The method of claim 14, wherein the write data are arranged as data blocks each having a logical address, and wherein the physically disabling of the write element prevents the write element from writing any additional data blocks to the data recording layer irrespective of the corresponding logical addresses of the additional blocks.

19. A write once read many (WORM) drive, comprising:
  a rotatable disc comprising a data recording layer;
  a data transducer selectively moveable with respect to the rotatable disc, the data transducer comprising a write element configured to write data blocks to the data recording layer and a read element configured to read the data blocks from the data recording layer, the data blocks identified by corresponding logical addresses; and
  a control circuit configured to, responsive to a write element disable signal, physically disable the write element to prevent the writing of any subsequent data blocks to the data recording layer by opening a communication path between the write element and a write driver, damaging the write element, damaging the write driver, or damaging a switch circuit disposed between the write element and the write driver.

20. The WORM drive of claim 19, wherein the read element of the data transducer is configured to subsequently read data blocks from the data recording layer after the control circuit has physically disabled the write element of the data transducer.

* * * * *